United States Patent [19]

Nambu

[11] Patent Number: 4,472,542

[45] Date of Patent: Sep. 18, 1984

[54] FREEZE-DRIED POLYVINYL ALCOHOL GEL

[75] Inventor: Masao Nambu, Yokohama, Japan

[73] Assignee: Nippon Oil Co., Ltd., Tokyo, Japan

[21] Appl. No.: 521,469

[22] Filed: Aug. 8, 1983

[30] Foreign Application Priority Data

Aug. 13, 1982 [JP] Japan ................................ 57-139705

[51] Int. Cl.$^3$ .............................................. C08L 29/04
[52] U.S. Cl. ...................................... 523/309; 264/28;
424/78; 524/557; 528/481
[58] Field of Search ........................ 523/309; 264/28;
424/78; 524/557; 528/481

[56] References Cited

FOREIGN PATENT DOCUMENTS 528071  7/1975  Japan ..................................... 264/28

*Primary Examiner*—Paul R. Michl
*Assistant Examiner*—Alex H. Walker
*Attorney, Agent, or Firm*—Jordan and Hamburg

[57] ABSTRACT

A process for the preparation of a hydrogel is provided. The process comprises the steps of solidifying an aqueous solution containing 2.5 to 25 wt % of a polyvinyl alcohol of an average polymerization degree of not less than 800 and 1 to 80 wt % of a water-soluble polyhydric alcohol by cooling the aqueous solution to not higher than $-3°$ C. and then dehydrating in vacuum the solidified mass into a percent dehydration degree of 5 to 95 wt %. The hydrogel is suitable for use as a cooling medium.

10 Claims, No Drawings

FREEZE-DRIED POLYVINYL ALCOHOL GEL

BACKGROUND OF THE INVENTION

1. Field of the Invention

The present invention relates to a process for the preparation of a hydrogel, and more particularly to a process for the preparation of hydrogel having properties superior to those of the conventional hydrogels from a polyvinyl alcohol.

2. Prior Art

A variety of gel compositions have hitherto been proposed to be used as cooling media and some of them are applied for practical uses. Such a gel is referred to as a cooling gel, chilling gel, coldness-keeping gel, coldness-keeping heat transfer medium, colloidal coolant, coldness-keeping means, coolant composition of Icenon (Trade Name), i.e. ice pillow. However, these known coolant gels are not satisfactory in properties or involve troublesome or difficult steps in preparation, as will be summarized below.

The easiest and well-known process for the preparation of a water-containing coolant gel is the preparation of agar gel. This process comprises the step of dissolving agar in boiling water or hot water of 80° to 94° C. to obtain a solution containing not less than 0.1 wt %, for example 1 to 10 wt % of agar and the step of allowing the solution to be cooled to room temperature, whereby a water-containing gel (hydrogel) having a water content of about 90 to 99 wt % is easily prepared. However, when the thus prepared agar gel is used as a substituting material for ice contained in an ice pillow or an ice bag after being cooled in an ice box of a refrigerator, the agar gel is poor in elasticity and too crumbly to provide a user with a comfortable touch or feel but gives a strange and uncomfortable feeling with additional disadvantage of collapse. A further disadvantage of the agar gel is that it is often frozen to form a rigid mass in a cooling box of a refrigerator, the rigid mass being objectionable for usage as a substituent for the ice bag. Although the freezing temperature of agar may be lowered by immersing agar in an antifreezing solution, such as ethylene glycol or propylene glycol, or by cooling a hot aqueous solution containing both agar and an antifreezing solution, the thus obtained gel is also crumbly and weak and, therefore, improper for use as a coldness-keeping gel in an ice pillow or the like.

It is already well-known that gelation occurs instantaneously when boric acid (or an aqueous solution of boric acid) or a borax (or an aqueous solution of borax) is added to an aqueous solution of polyvinyl alcohol. However, the gel thus obtained is so soft and weak that it is readily torn to pieces simply by pinching by fingers. Another disadvantage of this gel is the syneresis phenomenon, i.e. separation of contained water, during repeated uses (see Japanese patent publication No. 11210/1970).

In order to avoid hardening of a gel of a polyvinyl alcohol-borax system due to congealing of water content in the gel when the gel is cooled in an ice-box of a cooling box or refrigerator, there has been proposed a method in which an aqueous solution of polyvinyl alcohol is added with any of monohydric alcohols, polyhydric alcohols, glucose or sucrose followed by the addition of borax to be gelatinized. However, a gel prepared in accordance with this proposal becomes weaker with additional disadvantage that syneresis appears during repeated uses (see Japanese patent publication No. 19602/1971).

An alternate method for lowering the freezing point of the polyvinyl alcohol-borax system gel has been conceived, wherein the gel is immersed in an antifreezing solution, such as ethylene glycol or propylene glycol. However, the gel becomes too soft by the inclusion of ethylene glycol or propylene glycol to retain its shape. The polyvinyl alcohol-borax system gel has disadvantage in that it is apt to collapse by the action of other antifreezing solutions, such as methanol, ethanol and acetone.

After making researches for the development of a water-insoluble gel which is excellent in mechanical properties and hardly frozen in an ice box of a refrigerator by the use of polyvinyl alcohol in a low cost and in a stable condition, we have developed a process for the preparation of a hydrogel by cooling to solidify polyvinyl alcohol followed by dehydrating the solidified mass in vacuum and filed a pending U.S. patent application Ser. No. 344,006 on Jan. 29, 1982. We have filed another U.S. patent application Ser. No. 400,821 filed on July 22, 1982, relating to a process for the preparation of a gel for use as a cooling medium, the process being developed based on the finding that a solid gel which is highly elastic, excellent in softness and hardly to be frozen can be prepared by cooling to solidify an aqueous solution or an aqueous suspension containing a polyvinyl alcohol and a water-soluble polyhydric alcohol followed by dehydrating the solidified mass in vacuum. Based on the same finding, we have developed a gel for cooling a patient's head for preventing alopecia due to a harmful side effect of carcinostatics, and filed another patent application which is now pending as Japanese patent appln. No. 77502/1982.

The process for the preparation of a gel for use as a cooling medium, provided by our formerly-made proposals, comprises the steps of cooling to solidify an aqueous solution containing 2.5 to 10 wt % of a polyvinyl alcohol having a degree of hydrolysis of not less than 95 mol % and an average polymerization degree of not less than 1500 and 20 to 80 wt % of a water-soluble polyhydric alcohol having 2 to 6 hydroxyl groups to a temperature of not higher than − (minus) 6° C., and thereafter dehydrating the solidified mass in vacuum until the percentage dehydration rate (i.e. the weight reduction rate of the cooled and solidified mass) reaches within the range of not less than 5 wt % and not more than 95 wt %.

According to our formerly-made proposals, an aqueous solution or an aqueous dispersion containing the polyvinyl alcohol and the water-soluble polyhydric alcohol, as described above, is submitted to prepare a gel which is excellent in elasticity and softness and is hardly frozen even when cooled in an ice box of a refrigerator.

This gel made known to the art by our preceding patent applications is clearly distinguishable from a conventional gel prepared by cooling an aqueous solution of polyvinyl alcohol, in that the former-mentioned gel is insoluble in water e.g. warm water and free from stickiness. The gel proposed by our preceding patent applications was a novel gel which was quite different from the gel prepared by the spontaneous cooling of an aqueous solution of conventional polyvinyl alcohol and also quite different from the known gel prepared through chemical treatments of conventional aqueous solution of polyvinyl alcohol.

The gel made known to the art by our preceding patent applications has a touch resembling living tissue in itself, and thus may be used as a substituent for an ice pillow or an ice bag to give a cooling medium having high elasticity. Furthermore, it is free from stickiness and is highly resilient and elastic making it possible to mold it to have a shape of a helmet which may be snugly put on a patient's head without the need of charging or enclosing it in a pouch made of a polyvinylchloride or like material for the purpose of preventing alopecia due to a harmful side effect of a carcinostatic substance.

We have investigated further on the process of the preparation of such a hydrogel, and found that a hydrogel prepared from a polyvinyl alcohol having an average molecular weight of not less than 800 may be used for the same purpose to accomplish this invention.

OBJECTS AND SUMMARY OF THE INVENTION

A primary object of this invention is to provide a process for the preparation of a hydrogel, which is strong and highly elastic, free of unpleasant odor, and resists disintegration and provides a comfortable touch.

Another object of this invention is to provide a process for the preparation of a hydrogel having excellent insolubility in water.

A further object of this invention is to provide a process for the preparation of an inexpensive and yet stable hydrogel so that the gel structure is not disintegrated or broken even by the attack of a freezing point depressing agent, such as ethylene glycol.

A further object of this invention is to provide a process for the preparation of a hydrogel of high water content for use as a cooling medium.

A still further object of this invention is to provide a process for the preparation of a hydrogel which resists freezing even when it is placed in an ice-box of a cooling box or freezing box.

Additional object of this invention is to provide a process for the preparation of a hydrogel which may be molded to have desired shape and dimensions and immediately used as a final product without the need of shaping operation, or may be molded into a block and then shaped, for example by cutting, to have desired shape and dimensions.

The above and other objects of this invention will become apparent from the following description of the invention.

The process for the preparation of a hydrogel, according to this invention, comprises the steps of solidifying an aqueous solution containing 2.5 to 25 wt % of a polyvinyl alcohol having a degree of hydrolysis of not less than 95 mol % and an average polymerization degree of not less than 800, and 1 to 80 mol % of a water-soluble polyhydric alcohol having 2 to 6 hydroxyl groups, by cooling said aqueous solution to a temperature of not higher than − (minus) 3° C., and then dehydrating in vacuum the solidified mass until the percent dehydration rate reaches 5 to 95 wt %.

DESCRIPTION OF THE INVENTION

The present invention will now be described in detail hereinbelow.

The polyvinyl alcohol used in the present invention should have a degree of hydrolysis of not less than 95 mol %, preferably not less than 97 mol %, and more preferably not less than 98 mol %.

The polyvinyl alcohol used in the present invention should have an average polymerization degree of not less than 800. If a polyvinyl alcohol having an average polymerization degree of 800 to 1500 is used, the commercially available polyvinyl alcohol products having average polymerization degrees of 1,400, 1,100 and 1,000 may be used without any further treatment.

A polyvinyl alcohol having an average polymerization degree of more than 1,500, for example from 1,500 to 3,300, may also be used in the present invention. A commercially available polyvinyl alcohol product having a high average polymerization degree, for example an average polymerization degree of from 1,500 to 2,600, may be used without any further treatment.

In the first step of the process of the invention, an aqueous solution containing a polyvinyl alcohol and a water-soluble polyhydric alcohol is prepared. The concentration of the polyvinyl alcohol ranges from 2.5 to 25 wt %, preferably from 8 to 20 wt %. When a polyvinyl alcohol having a relatively low average polymerization degree, e.g. from 800 to 1,500, is used, it is recommendable to increase the concentration of the polyvinyl alcohol in the aqueous solution to a level of from 8 wt % to 25 wt %, preferably 15 wt % to 25 wt %. On the other hand, when a polyvinyl alcohol having a relatively high average polymerization degree, e.g. higher than 1,500, is used, the concentration thereof in the aqueous solution may be decreased to a lower level within the limit of not less than 2.5 wt %.

According to the present invention, a water-soluble polyhydric alcohol other than polyvinyl alcohol is added to the aforementioned aqueous solution of polyvinyl alcohol prior to the formation of a gel. The thus added water-soluble polyhydric alcohol acts as a freezing point depression agent, and serves to prevent the hydrogel prepared through the process of the invention from being readily and rapidly frozen to form a rigid or hard mass when it is allowed to stand in an ice box of a household refrigerator.

The water-soluble polyhydric alcohols each having 2 to 6 hydroxyl groups, which may be used in the present invention, include polyhydric alcohols having 2 to 6 carbon atoms. Ethylene glycol is an example of the polyhydric alcohols used as the freezing point depression agent in the present invention. The freezing point of pure ethylene glycol is − (minus) 16° C., and the freezing points of a 10 wt % and a 19 wt % aqueous solution thereof are, respectively, to − (minus) 3° C. and − (minus) 8° C. Not only the ethylene glycol, but also water-soluble polyhydric alcohols exert the freezing point depression effect in an aqueous solution to depress the freezing temperature of the gel to a temperature of lower than 0° C., the examples of such polyhydric alcohols being 1,2-propylene glycol which is commonly referred to simply as propylene glycol (−3° C. at a 10 wt % substitution), 1,3-propylene glycol (−3° C. at a 10 wt % substitution), glycerin (−1° C. at a 10 wt % substitution) and 2-methyl- 2,4-pentanediol (−2° C. at a 10 wt % substitution).

The freezing points of 0.8 to 1.8 wt % aqueous solutions of glucose range within −0.1° to 0.2° C., and the freezing points of 0.1 to 1 wt % aqueous solutions of sucrose range within −0.01° to −0.06° C. The freezing point of an aqueous solution may be depressed by the addition of a relatively small quantity of a polyhydric alcohol at some extent, and the amount of polyhydric alcohol used in the hydrogel according to this invention may be selected within a range of from 1 to 80 wt %, preferably from 1 to 40 wt %, in consideration of the conditions in use, particularly the storage temperature and time in the refrigerator.

A variety of water-soluble polyhydric alcohols referred to above is involved in the hydrogel prepared in accordance with the process of the invention, and serves to prevent the hydrogel from being air-dried or hardened. As has been described above, the water-soluble polyhydric alcohol may be added in an amount of not more than 80 wt % in consideration of the freezing point depression effect exerted by the selected polyhydric alcohol and also depending on the pre-cooling temperature of the hydrogel. In cases where the amount of the added polyhydric alcohol is small, for example the content thereof is less than 10 wt %, the hydrogel of the invention is deteriorated unless by prevention of air-dried state. However, in such a case, the hydrogel of the invention may be wrapped or enclosed by a film or a bag made of polyvinyl chloride or polyethylene, or may be used in a bare or exposed condition (without being wrapped or covered) for about an hour and then stored in a sealed container or a polyethylene pouch when used in a helmet shape to be put on a patient dosed with a carcinostatic substance, as will be described in detail hereinafter.

The aqueous solution containing a polyvinyl alcohol and a water-soluble polyhydric alcohol, used in the process of this invention, may be prepared by adding the polyvinyl alcohol and the water-soluble polyhydric alcohol into water to dissolve them in water, or the polyvinyl alcohol may be dissolved in water to prepare a solution into which the polyhydric alcohol or an aqueous solution thereof is admixed. The method of the preparation of the aqueous solution containing the polyvinyl alcohol and the water-soluble polyhydric alcohol is not limited as long as the concentration of polyvinyl alcohol is adjusted within the range of from 2.5 to 25 wt % and the concentration of water-soluble polyhydric alcohol is adjusted within the range of from 1 to 80 wt %. Because of the fact that polyvinyl alcohols are scarcely soluble in solvents other than water, the polyvinyl alcohol particles are dispersed in an aqueous solution containing a water-soluble polyhydric alcohol to form transparent micro-gel particles and the solution often becomes a transparent aqueous solution. However, the formation of such a suspension does not provide any obstacle against the actual operation of the process of the invention.

In the process of the invention, the aqueous solution or aqueous suspension containing the polyvinyl alcohol and the water-soluble polyhydric alcohol is cast into a mold having a desired shape. A concentrated aqueous solution of polyvinyl alcohol, particularly an aqueous solution containing more than 10 wt % of a polyvinyl alcohol, is considerably viscous, for example, a 16 wt % aqueous solution of a polyvinyl alcohol having an average polymerization degree of 1,400 has a viscosity of about 10,000 cP at 20° C. However, the viscosity of the solution may be decreased to 2,000 cP by heating the solution to 60° C. Accordingly, for facilitating easy handling of a concentrated aqueous solution of polyvinyl alcohol used in the process of the invention, it is recommended to handle the aqueous solution while maintaining the temperature of the solution at a temperature above the room temperature, for example higher than 50° C., if necessary. In the process of the invention, after the aqueous solution containing the polyvinyl alcohol and the water-soluble polyhydric alcohol is cast into the mold, the molded mass is cooled to become solidified at a temperature of not higher than $-3°$ C. to form a solidified mass of desired shape.

In the cooling step, the aforementioned aqueous solution or dispersion is cooled to a temperature lower than the freezing temperature at which the frozen mass becomes white and opaque. For instance, although a 15 wt % aqueous solution of a polyvinyl alcohol having an average polymerization degree of 1,400 has a freezing point of $-2°$ C. at which it becomes white and opaque, a supercooling state often occurs leaving the solution unfrozen and unhardened even at a temperature of $-4°$ to $-5°$ C. in a transparent solution form. However, by allowing the cooled mass in supercooling state to stand (at $-2°$ to $-5°$ C.) for a while, the mass may be converted to a normal frozen state (Freezing Point: $-2.5°$ C.) within a period of 30 minutes. The freezing temperature of an aqueous solution of a polyvinyl alcohol having a polymerization degree of 1,100 is found to be $-1.5°$ C. ($-4°$ to $-5°$ C. under the supercooling condition). The freezing temperature of the aqueous solution is further depressed by the coexisting polyhydric alcohol, and an aqueous solution containing 19 wt % of glycerin and 8 wt % of a polyvinyl alcohol (Average Polymerization Degree: 1,400) is depressed to $-5°$ C. ($-10°$ C. under the supercooling condition). The freezing temperature of the aqueous solution used in the process of the invention is changed depending on the polymerization degree and the concentration of the used polyvinyl alcohol, and also on the kind and the concentration of the polyhydric alcohol. Irrespective of the depression in freezing temperature, the aqueous solution used in the process of the invention should be cooled to a temperature low enough to freeze the aqueous solution containing the polyvinyl alcohol.

In the process of the present invention, the mass frozen by the preceding cooling step is then dehydrated in vacuum without thawing the mass. The mechanical properties of the resultant hydrogel are improved as the percentage dehydration rate (i.e. the weight reduction rate of the cooled and solidified gel) is increased. However, the percentage dehydration rate need not be increased so much higher as to form an excessively stronger gel, in view of ordinary applications of the gel, and ranges generally within 5 to 95 wt %, preferably 10 to 80 wt %, and more preferably within 15 to 40 wt % in order to prepare a gel of soft touch. The terminology "dehydration in vacuum" as herein used throughout the specification and claims, means that the frozen mass is dehydrated under a reduced pressure. The degree of reduced pressure applied at the dehydration step is not limited, and the dehydration may be effected under a reduced pressure of not higher than 2 mmHg, preferably not higher than 1 mmHg, more preferably not higher than 0.1 mmHg. The dehydration step is essential in the process of the present invention. A highly resilient gel having high mechanical strength cannot be formed unless the frozen mass is dehydrated through dehydration in vacuum. As the percentage dehydration rate increases, the strength of the gel is increased and the properties of the gel, including the non-sticking nature and the waterproof property, are remarkably improved. In view of these advantageous improvements attained by this partial dehydration of the frozen mass, the process of the invention always includes at least the partial dehydration step. However, in the process of the invention, the objects of the invention can be attained by partial dehydration, as aforementioned and defined in the claims, and the frozen mass need not be dehydrated or dried thoroughly which is otherwise necessitated for the production of a freeze-dried medicine for an injection or the production of freeze-dried foodstuffs, such as coffee, milk, fruit juice or noodles. Whereas the product gel becomes stronger as the percentage dehydration rate increases, as described above, the percentage dehydration rate may be freely selected depending on the desired strength of the gel. It should be noted again that this partial dehydration step is essential to exert a significant influence in the process of the invention, to prepare a hydrogel which is not fluidic and sticky and has a high water-content and improved mechanical strength.

The hydrogel prepared by the process of the invention has a touch resembling a living tissue by itself, and thus may be used as a cooling medium in substitution for the convention ice pillow or ice bag to give a moistened touch and a pleasant KONNYKU (devil's tongue jelly) like resiliency.

In addition to the applications substituting for the conventional ice pillow or ice bag, the gel prepared by the process of the invention may be used as a cooling medium for covering the head of a patient to prevent alopecia due to harmful side action of cancer-chemotherapy. When the gel is used to maintain the head of a patient under cold condition during the time of dosing the patient with carcinostatics, such as Daunomycin, i.e. Daunorubicin, or Adriamycin, i.e. 14-hydroxy daunorubicin (doxorubicin), alopecia,is prevented. It has been well known in the art that Adriamycin acts as a strong poison, although it exerts a noticeably superior curing effect for a variety of cancers and thus has been recognized as one of the important carcinostatic substances. For instance, when Adriamycin is dosed to patients at 25 day intervals, more than 90% of the patients suffer alopecia to thus feeling mental anguish by the loss of hairs from their heads. In addition to the mental pains suffered from the loss of hairs, this might cause a more serious problem in that some of them would have distrust of the modern medicines or medical treatments if they were in lack of adequate undestanding of the used carcinostatic substances.

This sudden alopecia seems to be caused by the antibiotics absorbed by the cellular tissues of the hairs, and it has been tried to cool the cells of the hairs to a temperature at which the metabolism of the living cellular tissues is considerably lowered, for example to about 25° C., thereby suppressing the absorption speed of the antibiotics by the cellular tissues. In view of the fact that the dosed antibiotics reach the head of a patient after about a few minutes after the dosage and leave therefrom after about 30 to 40 minutes, so that no appreciable presence of the antibiotics is found in the blood stream in the head thereafter, specific means for cooling the head of a patient for about 40 minutes from after the dosage of the carcinostatic substance have been searched for. The preceding trials and attempts include the method in which an ice bag is wound around the head, the method using a helmet made of a sponge containing a large quantity of cold water, and the method in which a jelly, agar or a polyvinyl alcohol-borax system gel is enclosed in a hollow portion of a cap molded from a polyvinyl chloride pouch. However, the method using the ice-bag is inconvenient in that water and ice contained in the bag flow downwards, in the wound bag to be dislocated unevenly thus making it difficult to cool the entire head portion uniformly. The helmet made of a sponge is inferior in water-retention capacity, resulting in that a large quantity of cold water is oozed out and dropped from the sponge. For this reason, this method is not practical, as well. In the method of using a cap molded from a bag of polyvinyl chloride and having inner cavities into which a high water content gel is filled as the cooling medium, it is difficult to hold the original shape of the cap or helmet, because the conventionally-known high water content hydrogels are either fluidal, for example, a polyvinyl alcohol-borax system gel and carboxymethyl cellulose gel, or soft and crumbly solids, for example, gels made of agar, jelly, carrageenan and alginic acid. A further disadvantage of the known gels is that they are poor in elasticity thus not fitting intimately over the head of the user.

Many proposals have been made to prevent the cooling medium from deformation or uneven dislocation, including a method of dividing the helmet over the whole area in the longitudinal and transverse direction to form a number of partitioned regions, thereby to prevent the fillers contained in separate regions from moving, and a method of providing a number of closed chambers or small cellular cavities into which cooling medium is filled. However, a gap or space is left between the head and the helmet, since the helmet per se lacks elasticity required for intimate contact.

As an alternate measure for the prevention of alopecia caused by the harmful side effect of Adriamycin, it has been proposed to clamp the skin of the head using a rubber band during the dosage of the antibiotics. However, this measure is not recommended, because the patient suffers severe pain by the clamping pressure applied around his head.

The disadvantages of the conventional methods for cooling the head of the patient are induced by a failure to provide a cooling medium having adequate properties, namely the disadvantages of such methods may be overcome by the provision of a hydrogel having high water content and provided with a rubber-like resiliency or elasticity and a mechanical strength high enough for retaining the shape of the molded helmet.

In accordance with another aspect of this invention, the aforementioned aqueous solution or suspension containing the defined polyvinyl alcohol and the defined water-soluble polyhydric alcohol is cast into a mold for a helmet, followed by cooling to solidify the molded mass to form a hydrogel suited for use as a helmet-shaped gel for cooling the head of a patient.

The shape of a helmet used for this purpose is somewhat different from the shapes of the helmets conventionally used for safety helmets at the job sites or used by batters in a baseball game, and the helmet suited for this scalp hypothermia should extend to cover not only the entire portion of the head on which hairs grow but also the side locks, i.e. hairs at left and right sides of the head, preferably to cover the portions of the face on which eyebrows grow. The helmet according to this invention for use in medical therapy may be easily produced by using a mold prepared by modifying the molds used for the production of helmets for the operators of motorcycles or the players of an ice hockey game.

According to the process of the invention, a helmet-shaped mass of a hydrogel may be directly molded from the aqueous solution having the composition as defined in the appended claims, and may be used without being wrapped or enclosed by a strip or a pouch made of, for example, polyvinyl chloride, polyethylene or polypropylene, to cover closely the overall area of the head of the patient with a moistened comfortable touch. Since the hydrogel prepared in accordance with the process of the invention is highly elastic and resilient, the inner periphery of the molded hydrogel readily takes the contour following to the shape and dimensions of the head of the patient, to cover snugly the surface thereof. It should be clear that the hydrogel prepared through the process of this invention and having a KON-NYAKU-like or pudding-like touch suited for directly and closely covering the head of the patient is superior to the conventional gels of jelly or paste form enclosed in a polyvinyl chloride or rubber pouch.

EXAMPLES OF THE INVENTION

The present invention will now be described more specifically with reference to examples thereof.

EXAMPLE 1

An aqueous suspension composed of 210 g (Water Content: 7 wt %) of a polyvinyl alcohol having a degree of hydrolysis of 99.1 mol %, an average polymerization degree of 1,400 and a viscosity of a 4% aqueous solution thereof of 20 cP(at 20° C.), 100 g of glycerin (Water Content: 8 wt %) and 1,390 g of water was prepared and sterilized by steam at 120° C. for 35 minutes. The suspension was continuously stirred in a germ-free chamber to dissolve the polyvinyl alcohol and glycerin uniformly to prepare an aqueous solution containing 11 wt % of polyvinyl alcohol and 5 wt % of glycerin.

1,870 g of the aforementioned aqueous solution was cast into a stainless steel mold for molding a helmet having a depth of about 20 cm, an outer diameter of about 17 cm and a thickness of about 2 cm. After being allowed to stand for cooling at −14° C. for 12 hours, the cast mass was subjected to dehydration in vacuum to remove 220 g of water (Percent Dehydration Rate: 12 wt %), and then thawed by allowing to stand at the room temperature.

The thus prepared helmet was highly elastic and very soft, and had a sufficiently high mechanical strength enabling easy put-on and put-off operations of the helmet. The helmet was stored in a refrigerator to cool the same to 0° C., and put on the head of a child (8 years old) who was lying in the supine position. The temperature of the scalp reached 20° to 22° C. after the lapse of 7 minutes, and the scalp was maintained at a temperature of 20° to 25° C. over a period of 40 minutes thereafter.

EXAMPLE 2

An aqueous suspension composed of 430 g (Water Content: 7 wt %) of a polyvinyl alcohol having a degree of hydrolysis of 99.7 mol %, an average polymerization degree of 1,000 and a viscosity at 20° C. of a 4% aqueous solution thereof of 10 cP, 175 g of glycerin, 0.35 g of n-butyl-p-hydroxybenzoate, 17.5 g of colistin sulfate and 2,800 g of water was prepared and sterilized by steam at 120° C. for 25 minutes. The suspension was continuously stirred in a germ-free chamber to dissolve the components uniformly to prepare an aqueous solution containing 12 wt % of polyvinyl alcohol, 5 wt % of glycerin, 100 ppm of n-butyl-p-hydroxybenzoate and 5,000 ppm of colistin sulfate. 3,500 g of the thus prepared aqueous solution was cast into a stainless steel mold for molding a helmet having a depth of about 25 cm, an outer diameter of about 21 cm and a thickness of about 2 cm. After being allowed to stand for cooling at −10° C. for 24 hours, the cast mass was subjected to dehydration in vacuum to remove 330 g of water (Percent Dehydration Rate: 10.0 wt %), and then thawed by allowing to stand at room temperature.

The thus prepared helmet was highly elastic and very soft, and had a sufficiently high mechanical strength enabling easy put-on and put-off operations. The helmet was allowed to stand in an ice box of a refrigerator for an hour to show that the original elasticity and softness were retained without the helmet being frozen or stiffened. The helmet was allowed to stand at room temperature until the temperature thereof reached 0° C. whereupon it was put on the head of an adult who was lying in the supine position with his head raised. The scalp temperature reached 20° to 22° C. after the lapse of 8 minutes, and was maintained at 21° to 25° C. over a period of subsequent 40 minutes.

COMPARATIVE EXAMPLE 1

1,900 g of the same aqueous solution of the polyvinyl alcohol and glycerin as used in Example 1 was cast into a mold for molding a helmet, and then cooled at −40° C. for 24 hours. The cooled mass was allowed to stand at the room temperature without subjecting to partial dehydration in vacuum which should be essentially involved in the process of the invention.

The molded mass taken out of the mold was excessively soft that it could not be placed in position on a desk, with an additional disadvantage that it was extremely sticky thus giving a very uncomfortable touch when put on the head of a person with unpleasant feeling. The helmet was apt to slip out of the user's hands when it was handled to put it on or off the head, and it was found that the helmet was weak, being easily broken.

The results of this comparative example clearly show the advantageous effect of the partial dehydration step wherein a cooled mass of the hydrogel is dehydrated in vacuum according to the present invention.

EXAMPLE 3

An aqueous suspension composed of 270 g (Water Content: 7 wt %) of a polyvinyl alcohol having a degree of hydrolysis of 99.3 mol %, an average polymerization degree of 1.800 and a viscosity at 20° C. of a 4% aqueous solution thereof of 29 cP, 500 g of propylene glycol and 1,230 g of water was prepared, to obtain an aqueous suspension containing 13 wt % of polyvinyl alcohol and 25 wt % of propylene glycol, and sterilized by steam at 120° C. for 25 minutes. The suspension was then stirred in a germ-free chamber to dissolve the components uniformly to prepare an aqueous solution having a viscosity of 4,500 cP (at 20° C.) and 2,500 cP (at 40° C.). The viscosity of the solution was decreased to 1,700 by maintaining the temperature of the solution at 50° C. 2.2 kg of the aqueous solution was cast into a mold for molding a helmet while maintaining the temperature thereof at 50° to 60° C., followed by cooling at −30° C. for 7 hours, and then subjected to dehydration in vacuum to remove 225 g of Water (Percent Dehydration Rate: 11 wt %). The partially dehydrated hydrogel was allowed to stand at room temperature to be thawed.

The thus prepared helmet was highly elastic and very soft, and had a sufficient strength enabling repeated put-on and put-off operations. The helmet was placed in a cooling box until the temperature thereof reached 0°

C., and then put on the head of an adult who was lying in the supine position. The temperature of the scalp reached 21° to 23° C. after the lapse of 8 minutes, and was maintained at 20° to 25° C. over a period of subsequent 38 minutes.

COMPARATIVE EXAMPLE 2

1,900 g of the same aqueous solution of the polyvinyl alcohol and glycerin as used in Example 3 was cast into a mold for molding a helmet, and then cooled at −40° C. for 24 hours. The cooled mass was allowed to stand at room temperature to thaw the hydrogel, without subjecting to partial dehydration in vacuum which should be essentially involved in the process of the invention.

The molded mass taken out of the mold was too soft and weak so that it could not be placed in position on a desk, with an additional disadvantage that it was extremely sticky giving a very uncomfortable touch when put on the head of a person with unpleasant feeling. The helmet was apt to slip out of the user's hands when it was handled to put it on or off the head, and it was found that the helmet was weak being easily broken. The results of this comparative example clearly show the advantageous effect of the partial dehydration step involved in the process of the invention, wherein a cooled mass of hydrogel is dehydrated in vacuum.

EXAMPLE 4

100 g of a polyvinyl alcohol having a degree of hydrolysis of 99.5 mol %, a viscosity average polymerization degree of 2,600 and a viscosity at 20° C. of a 4% aqueous solution thereof of 67 cP was dissolved in 1360 g of water, and mixed with 44 g of propylene glycol. The thus prepared solution was cast into a mold for molding a helmet. After being cooled at −20° C. for 8 hours, the molded helmet was dehydrated in vacuum to remove 200 g of water (Percent Dehydration Rate: 13 wt %), and then allowed to stand at room temperature to thaw the hydrogel.

The thus prepared helmet was highly elastic and very soft, and had a sufficient mechanical strength enabling repeated put-on and put-off operations.

The helmet was placed in an ice storage container until the temperature thereof reached 0° C., and then put on the head of an adult who was lying in the supine position. The temperature of the scalp reached 20° to 22° C. after the lapse of 8 minutes, and was maintained at 20° to 25° C. over a period of subsequent 33 minutes. The helmet had a composition composed of 7.5 wt % of polyvinyl alcohol, 3 wt % of propylene glycol and 89.5 wt % of water.

EXAMPLE 5

An aqueous suspension containing 68 g (Water Content: 7 wt %) of a polyvinyl alcohol having a degree of hydrolysis of 99.5 mol %, a viscosity average polymerization degree of 2,600 and a viscosity at 20° C. of a 4% aqueous solution thereof of 67 cP was sterilized by steam at 120° C. for 30 minutes, and then continuously stirred in a germ-free chamber to dissolve the components uniformly to obtain an aqueous solution containing 3.2 wt % of polyvinyl alcohol and 5 wt % of propylene glycol.

2 kg of the aqueous solution was cast into a mold for molding a helmet, followed by cooling at −25° C. for 6 hours, and then subjected to dehydration in vacuum to remove 230 g of water (Percent Dehydration Rate: 12 wt %). Then, the partially dehydrated mass was allowed to stand at room temperature to thaw the hydrogel.

The thus prepared helmet was highly elastic and very soft, and had a sufficient mechanical strength enabling easy put-on and put-off operations. The helmet was placed in an ice storage box until the temperature thereof reached 0° C., and then put on the head of an adult who was lying in the supine position. The temperature of the scalp reached 20° to 22° C. after the lapse of 9 minutes, and was maintained at 20° to 25° C. over a period of subsequent 38 minutes.

EXAMPLE 6

An aqueous suspension composed of 53 g (Water Content: 7 wt %) of a polyvinyl alcohol having a degree of hydrolysis of 97.5 mol %, a viscosity average polymerization degree of 2,200 and a viscosity at 20° C. of a 4% aqueous solution thereof of 56 cP, 100 g (Water Content: 8 wt %) of glycerin and 1,850 g of water was sterilized by steam at 120° C. for 35 minutes, and then stirred in a germ-free chamber to dissolve the components uniformly to obtain an aqueous solution containing 2.5 wt % of polyvinyl alcohol and 5 wt % of glycerin.

1,900 g of the aqueous solution was cast into a stainless steel mold for molding a helmet having a depth of about 21 cm, an outer diameter of about 17 cm and a wall thickness of about 2 cm. After being cooled at −20° C. for 9 hours, the molded mass was subjected to dehydration in vacuum to remove 220 g of water (Percent Dehydration Rate: 12 wt %), and then allowed to stand at room temperature to thaw the hydrogel.

The thus prepared helmet was highly elastic and very soft, and had a sufficient strength enabling easy put-on and put-off operations. The helmet was placed in a refrigerator until the temperature thereof reached 0° C., and then put on the head of a child (8 years old) who was lying in the supine position. The temperature of the scalp reached 20° to 22° C. after the lapse of 8 minutes, and was maintained at 20° to 25° C. over a period of subsequent 38 minutes.

COMPARATIVE EXAMPLE 3

1,900 g of the same aqueous solution of the polyvinyl alcohol and glycerin as used in Example 6 was cast into a mold for molding a helmet, and then cooled at −40° C. for 24 hours. The cooled mass was allowed to stand at room temperature to thaw the hydrogel without subjecting to partial dehydration in vacuum, which should be essentially involved in the process of the invention.

The molded mass taken out of the mold was too soft and weak, so it could not be placed in position on a desk, with an additional disadvantage that it was extremely sticky thus giving a very uncomfortable touch when put on the head of a person with unpleasant feeling. The helmet was apt to slip out of the user's hands when it was handled to put on or off the head. It was found that the helmet was weak, being easily broken. The results of this comparative example clearly show the advantageous effect of the partial dehydration step involved in the process of the invention, wherein a cooled mass of hydrogel is dehydrated in vacuum.

EXAMPLE 7

An aqueous dispersion composed of 108 g (Water Content: 7 wt %) of a powder of a polyvinyl alcohol having a degree of hydrolysis of 99.1 mol %, a viscosity average polymerization degree of 2,400 and a viscosity at 20° C. of a 4% aqueous solution thereof of 60 cP, 100 g of glycerin and 1,790 g of water was sterilized by steam at 120° C. for 35 minutes, and then stirred in a germ-free chamber to obtain an aqueous solution containing 2.5 wt % of polyvinyl alcohol and 5 wt % of glycerin. 100 mg (corresponding to 50 ppm) of butyl-$p$-hydroxybenzoate and 10 g (corresponding to 5,000 ppm) of a powder of furadiomycin sulfate were dissolved in the aforementioned aqueous solution.

The thus prepared aqueous solution was cast into a stainless steel mold for molding a helmet having a depth of about 23 cm, an outer diameter of about 20 cm and a wall thickness of about 2 cm. After being cooled at −35° C. for 9 hours, the molded mass was dehydrated in vacuum to remove 210 g of water (Percent Dehydration Rate: 10 wt %), and then allowed to stand at room temperature to thaw the hydrogel.

The thus prepared helmet was highly elastic and very soft, and had a sufficient mechanical strength enabling easy put-on and put-off operations. The helmet retained the original softness and elasticity without being frozen or stiffened after it was placed in an ice box of a refrigerator for an hour. The helmet was allowed to stand at room temperature until the temperature thereof reached 0° C., and then put on the head of an adult who was lying in the horizontal supine position. The temperature of the scalp reached 21° to 23° C. after the lapse of 9 minutes, and was maintained at 21° to 25° C. over a period of subsequent 37 minutes.

EXAMPLE 8

An aqueous suspension composed of 86 g (Water Content: 7 wt %) of a polyvinyl alcohol having a degree of hydrolysis of 97.5 mol %, a viscosity average polymerization degree of 2,200 and a viscosity at 20° C. of a 4% aqueous solution thereof of 56 cP, 160 g of glycerin, 2,950 g of water, and 16 g of a powder of paromomycin sulfate was sterilized by steam at 120° C. for 25 minutes, followed by stirring in a germ-free chamber to dissolve the components uniformly thereby to prepare an aqueous solution containing 2.5 wt % of polyvinyl alcohol, 5 wt % of glycerin and 5,000 ppm of paromomycin sulfate. 3.1 kg of the thus prepared aqueous solution was cast into a mold for molding a helmet having a depth of about 25 cm, an outer diameter of about 22 cm and a wall thickness of about 2 cm. After being cooled at −40° C. for 6 hours, the molded mass was dehydrated in vacuum to remove 200 g of water (Percent Dehydration Rate: 6.5 wt %), and then allowed to stand at room temperature to thaw the hydrogel.

The thus prepared helmet was highly elastic and very soft, and had a sufficient mechanical strength enabling easy put-on and put-off operations. The helmet retained the original softness and elasticity without being frozen or stiffened after it was placed in an ice box of a refrigerator for an hour. The helmet was allowed to stand at room temperature until the temperature thereof reached 0° C., and then put on the head of an adult who was lying in the semi-prone position. The temperature of the scalp reached 21° to 23° C. after the lapse of 9 minutes, and was maintained at 21° to 25° C. over a period of subsequent 39 minutes.

EXAMPLE 9

An aqueous suspension composed of 144 g (Water Content: 7 wt %) of a polyvinyl alcohol having a degree of hydrolysis of 99.5 mol %, a viscosity average polymerization degree of 2,600 and a viscosity at 20° C. of a 4% aqueous solution thereof of 67 cP, 175 g of glycerin, 0.35 g of n-butyl-$p$-hydroxybenzoate, 17.5 g of a powder of colistin sulfate and 3,100 g of water was sterilized by steam at 120° C. for 25 minutes, followed by stirring in a germ-free chamber to dissolve the components to obtain an aqueous solution containing 4 wt % of polyvinyl alcohol, 5 wt % of glycerin, 100 ppm of n-butyl-$p$-hydroxybenzoate and 5,000 ppm of colistin sulfate. 3,400 g of the thus obtained aqueous solution was cast into a stainless steel mold for molding a helmet having a depth of about 26 cm, an outer diameter of about 22 cm and a wall thickness of about 2 cm. After being cooled at −25° C. for 8 hours, the molded mass was dehydrated in vacuum to remove 325 g of water (Percent Dehydration Rate: 9.5 wt %), and then allowed to stand at room temperature to thaw the hydrogel.

The thus prepared helmet was highly elastic and very soft, and had a sufficient mechanical strength enabling easy put-on and put-off operations. The helmet retained the original softness and elasticity without being frozen or stiffened after it was placed in an ice box of a refrigerator for an hour. The helmet was allowed to stand at room temperature until the temperature thereof reached 0° C., and then put on the head of an adult who was lying in the supine position with his head raised. The temperature of the scalp reached 21° to 23° C. after the lapse of 8 minutes, and was maintained at 21° to 25° C. over a period of subsequent 38 minutes.

In the foregoing description, the present invention has been specifically disclosed by referring to some examples thereof. However, it should be appreciated that various modifications and variations can be easily made by those skilled in the art without departing from the spirit of the invention. It is, thus intended to include all such modifications and variations within the wide scope of the present invention defined by the appended claims.

What is claimed is:

1. A process for the preparation of a hydrogel, comprising the steps of solidifying an aqueous solution containing 2.5 to 25 wt % of a polyvinyl alcohol having a degree of hydrolysis of not less than 95 mol % and an average polymerization degree of not less than 800, and 1 to 80 wt % of a water-soluble polyhydric alcohol having 2 to 6 hydroxyl groups, by cooling said aqueous solution to a temperature of not higher than − (minus) 3° C., and then dehydrating in vacuum the solidified mass until the percent dehydration rate reaches 5 to 95 wt %.

2. The process as claimed in claim 1, wherein said polyvinyl alcohol has a degree of hydrolysis of not less than 97 mol %.

3. The process as claimed in claim 1, wherein said polyvinyl alcohol has an average polymerization degree of 800 to 1500.

4. The process as claimed in claim 1, wherein said polyvinyl alcohol has an average polymerization degree of 1500 to 3300.

5. The process as claimed in claim 1. wherein the concentration of said polyvinyl alcohol is 8 to 25 wt %.

6. The process as claimed in claim 1, wherein the concentration of said water-soluble polyhydric alcohol is 1 to 40 wt %.

7. The process as claimed in claim 1, wherein said aqueous solution is maintained at a temperature of not lower than 50° C. prior to the cooling and solidification step.

8. The process as claimed in claim 1, wherein said polyhydric alcohol is selected from the group consisting of ethylene glycol, propylene glycol and glycerin.

9. The process as claimed in claim 1, wherein said dehydration in vacuum is effected at a reduced pressure of not higher than 2 mmHg.

10. The process as claimed in claim 1, wherein said hydrogel is used as a cooling medium.

* * * * *